United States Patent
Jaaskelainen et al.

(10) Patent No.: US 9,523,787 B2
(45) Date of Patent: Dec. 20, 2016

(54) REMOTE PUMPED DUAL CORE OPTICAL FIBER SYSTEM FOR USE IN SUBTERRANEAN WELLS

(71) Applicant: HALLIBURTON ENERGY SERVICES, INC., Houston, TX (US)

(72) Inventors: Mikko Jaaskelainen, Katy, TX (US); Ian B. Mitchell, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/847,183

(22) Filed: Mar. 19, 2013

(65) Prior Publication Data
US 2014/0285875 A1    Sep. 25, 2014

(51) Int. Cl.
| | | |
|---|---|---|
| G01V 8/16 | (2006.01) | |
| H01S 3/067 | (2006.01) | |
| E21B 47/12 | (2012.01) | |
| H01S 3/094 | (2006.01) | |

(52) U.S. Cl.
CPC .............. G01V 8/16 (2013.01); H01S 3/06733 (2013.01); H01S 3/06754 (2013.01); *E21B 47/123* (2013.01); *H01S 3/094015* (2013.01); *H01S 3/094069* (2013.01)

(58) Field of Classification Search
CPC ...... G01V 8/16; E21B 47/123; H01S 3/06737; H01S 3/06733
See application file for complete search history.

(56) References Cited

U.S. PATENT DOCUMENTS

| | | | | |
|---|---|---|---|---|
| 4,162,400 A | * | 7/1979 | Pitts, Jr. ..................... | 340/854.7 |
| 5,191,206 A | | 3/1993 | Boiarski et al. | |
| 5,389,782 A | * | 2/1995 | Hilliard ..................... | 250/227.17 |
| 5,892,615 A | * | 4/1999 | Grubb et al. ............ | 359/341.31 |
| 6,281,489 B1 | * | 8/2001 | Tubel ..................... | E21B 47/00 |
| | | | | 166/250.15 |
| 6,317,537 B1 | * | 11/2001 | Ionov et al. ..................... | 385/32 |
| 6,728,165 B1 | * | 4/2004 | Roscigno et al. .............. | 367/14 |

(Continued)

FOREIGN PATENT DOCUMENTS

| | | |
|---|---|---|
| WO | 2004003342 A2 | 1/2004 |
| WO | WO-2004003342 A2 | 1/2004 |

(Continued)

OTHER PUBLICATIONS

Encyclopedia of Laser Physics and Technology; "Double-clad Fibers", article via http://www.rp-photonics.com/double_clad_fibers.html, dated Feb. 12, 2013, 4 pages.

(Continued)

*Primary Examiner* — Eric Bolda
(74) *Attorney, Agent, or Firm* — Chamberlin Hrdlicka

(57) ABSTRACT

A downhole optical system can include an optical fiber disposed in a subterranean well, and an optical fiber amplifier which amplifies optical power in a core of the optical fiber in the well, the amplifier being optically pumped with optical power in another core of the optical fiber in the well. Another downhole optical system can include an optical fiber disposed in a subterranean well, the optical fiber comprising multiple cores, and an optical fiber amplifier comprising multiple cores optically coupled respectively to the optical fiber multiple cores in the well.

27 Claims, 5 Drawing Sheets

(56) References Cited

U.S. PATENT DOCUMENTS

| | | | |
|---|---|---|---|
| 6,910,803 B2 | 6/2005 | MacDougall | |
| 6,970,396 B2* | 11/2005 | Maas et al. | 367/20 |
| 6,995,899 B2 | 2/2006 | Aronstam | |
| 7,583,371 B2 | 9/2009 | MacDougall | |
| 7,599,047 B2 | 10/2009 | Zou et al. | |
| 8,274,400 B2 | 9/2012 | Wilson et al. | |
| 8,304,714 B2* | 11/2012 | Csutak | 250/269.1 |
| 8,365,431 B1 | 2/2013 | Parish | |
| 8,451,453 B2* | 5/2013 | Molin | G01D 5/35303 356/480 |
| 9,075,252 B2* | 7/2015 | Samson et al. | G01V 8/24 |
| 2002/0040963 A1* | 4/2002 | Clayton et al. | 250/227.14 |
| 2002/0063866 A1* | 5/2002 | Kersey et al. | 356/478 |
| 2003/0146393 A1* | 8/2003 | Youngner | 250/458.1 |
| 2003/0169489 A1 | 9/2003 | Jiang et al. | |
| 2004/0113104 A1 | 6/2004 | Maida, Jr. | |
| 2004/0190588 A1 | 9/2004 | MacDougall | |
| 2005/0094129 A1 | 5/2005 | MacDougall | |
| 2006/0133711 A1* | 6/2006 | Vannuffelen et al. | 385/1 |
| 2006/0152383 A1* | 7/2006 | Yamate et al. | 340/853.1 |
| 2006/0289724 A1 | 12/2006 | Skinner | |
| 2008/0063337 A1 | 3/2008 | MacDougall et al. | |
| 2009/0326826 A1 | 12/2009 | Hull et al. | |
| 2010/0107754 A1* | 5/2010 | Hartog et al. | 73/152.47 |
| 2010/0181472 A1 | 7/2010 | Csutak | |
| 2010/0327764 A1* | 12/2010 | Knapp | 315/250 |
| 2011/0088462 A1 | 4/2011 | Samson et al. | |
| 2011/0090496 A1 | 4/2011 | Samson et al. | |
| 2011/0163891 A1* | 7/2011 | Wilson | H04B 10/2504 340/854.9 |
| 2011/0188798 A1* | 8/2011 | Yafuso | 385/2 |
| 2011/0290992 A1* | 12/2011 | Sato et al. | 250/253 |
| 2011/0292763 A1* | 12/2011 | Coates et al. | 367/25 |
| 2012/0127459 A1 | 5/2012 | Handerek | |
| 2012/0294607 A1 | 11/2012 | Winzer et al. | |
| 2013/0271769 A1* | 10/2013 | Handerek | 356/446 |
| 2014/0362431 A1* | 12/2014 | Mitchell et al. | 359/326 |
| 2015/0192773 A1* | 7/2015 | Perkins et al. | G01V 8/10 |

FOREIGN PATENT DOCUMENTS

| | | |
|---|---|---|
| WO | WO-2005033465 A2 | 4/2005 |
| WO | WO-2007140134 A2 | 12/2007 |
| WO | WO-2014149227 | 9/2014 |

OTHER PUBLICATIONS

OZ OPTICS; "Fiber Optic Distributed Brillouin Sensors", article DTS0115 via www.ozoptics.com, dated Sep. 22, 2006, 5 pages.

Thevenaz, Luc et al.; "Truly Distributed Strain and Temperature Sensing Using Embedded Optical Fibers", article via http://dewww.epfl.ch/met/metrology.html, received Feb. 11, 2013, 15 pages.

Smith, Jeff et al.; "Simultaneous Distributed Strain and Temperature Measurement", Applied Optics, vol. 38, No. 25, dated Sep. 1, 1999, 6 pages.

AFL; "DNS-4793 FiberRod—2.03mm Glass Matrix with VHS500 CSPFA fiber, 200C glass version", product specifications, received Feb. 11, 2013, 1 page.

Fibertronix; "Double Clad Optical Fiber", product specification, dated Feb. 3, 2010, 1 page.

Luna Innovations; "Fiber Optic Shape Sensing", technology snapshot, Feb. 24, 2012, 3 pages.

Laser Focus World; "Multicore Optical Fibers Could Be Next-Gen PON Solution", article via http://www.laserfocusworld.com/articles/2012/01/multicore-optical-fibers.html, dated Feb. 8, 2013, 2 pages.

A. Boh Ruffin; "Stimulated Brillouin Scattering: An Overview of Measurements, System Impairments, and Applications", NIST-SOFM 2004, dated 2004, 6 pages.

Luna Technologies; "Optical Backscatter Reflectometer", Model OBR 4600, LTOBR4600 article via www.lunatechnologies.com, dated Sep. 3, 2010, 4 pages.

Luna Innovations Incorporated; "Fiber Optic Shape Sensing", technology snapshot, dated Aug. 24, 2012, 4 pages.

Ezine Articles; "What are Optical Fiber Amplifiers and How Do They Work?", article via http://ezinearticles.com, dated Feb. 12, 2013, 2 pages.

P.C. Wait, et al.; "Landau Placzek Ratio Applied to Distributed Fibre Sensing", Optics Communications 122 article, pp. 141-146, dated Jan. 1, 1996, 6 pages.

Specification and Drawings for U.S. Appl. No. 13/847,165, filed Mar. 19, 2013, 27 pages.

Specification and Drawings for U.S. Appl. No. 13/847,204, filed Mar. 19, 2013, 22 pages.

International Search Report with Written Opinion issued Jun. 3, 2014 for PCT Patent Application No. PCT/US2014/015484, 16 pages.

International Application Serial No. PCT/US2014/015482, International Preliminary Report on Patentability mailed Oct. 1, 2015, 14 pgs.

International Application Serial No. PCT/US2014/015482, International Search Report mailed May 14, 2014, 3 pgs.

Canadian Application Serial No. 2,890,076, Office Action mailed Apr. 20, 2016, 4 pgs.

European Application Serial No. 14770797.0, Office Action mailed Oct. 27, 2015, 2 pgs.

European Application Serial No. 14770797.0, Response filed Feb. 26, 2016 to Office Action mailed Oct. 27, 2015, 11 pgs.

International Application Serial No. PCT/US2014/015482, Written Opinion mailed May 14, 2014, 12 pgs.

European Search Opinion issued in corresponding application No. EP 14770797.0 dated Oct. 28, 2016, 11 pgs.

* cited by examiner

REMOTE PUMPED DUAL CORE OPTICAL FIBER SYSTEM FOR USE IN SUBTERRANEAN WELLS

BACKGROUND

This disclosure relates generally to use of optical equipment and techniques with subterranean wells and, in an example described below, more particularly provides a remote pumped multiple core optical fiber system.

Fiber amplifiers have been used for amplifying optical signals in optical fibers. However, optical pumping for a fiber amplifier is typically provided via a separate optical fiber. Thus, to provide direct optical amplification in a well, at least one additional optical fiber needs to be installed in the well.

Therefore, it will be appreciated that improvements are needed in the art of constructing and operating optical systems in wells.

DETAILED DESCRIPTION

Figure 1:
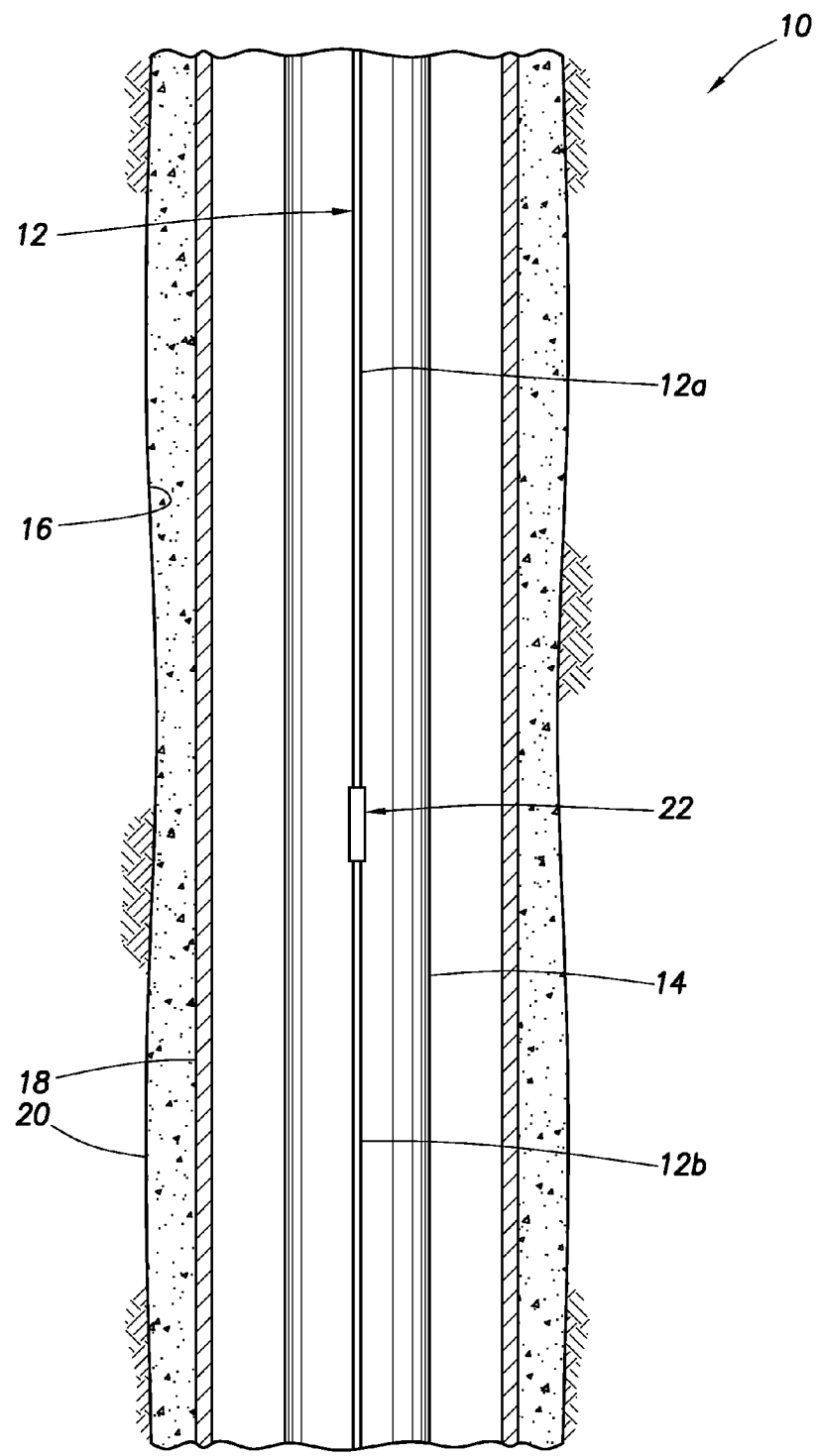
FIG. 1 is a representative partially cross-sectional view of a well optical system and associated method which can embody principles of this disclosure.

Representatively illustrated in FIG. 1 is a well optical system 10 and associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, an optical fiber 12 is positioned external to a tubular string 14 installed in a wellbore 16. The wellbore 16 is lined with casing 18 and cement 20. The optical fiber 12 is visible in FIG. 1, but preferably in actual practice, the optical fiber would be included in a cable, contained in a small diameter tube, or otherwise protected from well fluids and from damage.

In other examples, the optical fiber 12 could be positioned in an interior or a wall of the tubular string 14, exterior to or in a wall of the casing 18, in the cement 20, etc. In some examples, the optical fiber 12 could be positioned in an uncased or open hole section of the wellbore 16. In some examples, a cable or tube could comprise or contain other types or combinations of lines (such as, electrical and/or hydraulic lines, etc.). Thus, it should be clearly understood that the scope of this disclosure is not limited to the details of the FIG. 1 example of the system 10 and method.

As depicted in FIG. 1, an optical fiber amplifier 22 is optically connected between sections 12a,b of the optical fiber 12. Although only one amplifier 22 is illustrated in FIG. 1, any number of amplifiers may be used, as desired. The amplifier(s) 22 can be spaced apart, positioned and/or distributed along the optical fiber 12 as desired, for example, to enable very long distance optical telemetry of data, commands, optical power, etc.

In an example described more fully below, the amplifier 22 can comprise a dual core optical fiber, in which one of the cores is used for optically pumping the other core, which has been doped with one or more species of rare earth ions, such as erbium or praseodymium. Thus, the doped core essentially becomes a fiber laser pumped via another core of the amplifier 22. Any number or combination of cores may be used in the fiber amplifier 22 in keeping with the scope of this disclosure.

Figure 2:
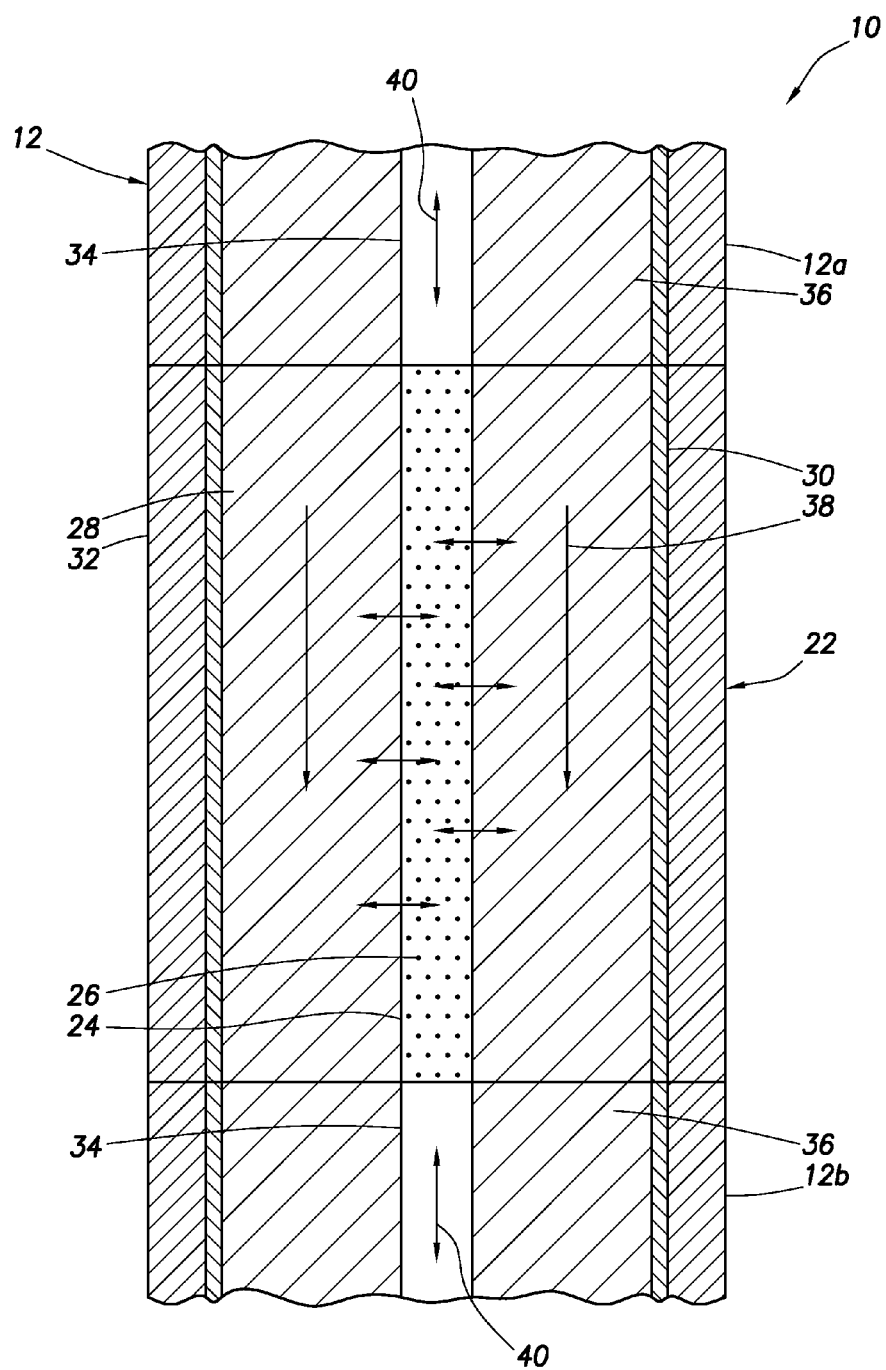
FIG. 2 is an enlarged scale representative cross-sectional view of a fiber amplifier and multiple core optical fiber which may be used in the system and method of FIG. 1.

Referring additionally now to FIG. 2, an enlarged scale cross-sectional view of the amplifier 22 is representatively illustrated. In this view, it may be seen that the amplifier 22 includes an inner core 24 doped with rare earth ions 26. The inner core 24 is surrounded by an outer core (or inner cladding) 28. The outer core 28 is surrounded by an outer cladding 30 and a polymer jacket 32.

Although only two cores 24, 28 are depicted in FIG. 2, any number or combination of cores may be used in other examples. Although the cores 24, 28 and other elements of the amplifier 22 are depicted as being substantially cylindrical or annular in shape, other shapes (such as elliptical, rectangular, D, or off-centered cross-sectional shapes, etc.) may be used, as desired. Thus, the scope of this disclosure is not limited to the details of the amplifier 22 as depicted in the drawings or described herein.

In the FIG. 2 example, the amplifier inner core 24 is optically connected (e.g., via fusion splicing, use of optical connectors, etc.) to an inner core 34 of the optical fiber 12, and the amplifier outer core 28 is optically connected to an outer core 36 of the optical fiber. Thus, the optical fiber 12 comprises a dual core fiber, similar to the amplifier 22, except that the inner core 34 of the optical fiber is not doped with the rare earth ions 26.

Optical power 38 transmitted via the outer cores 28, 36 optically pumps the rare earth ions 26 in the amplifier inner core 24. Optical signals 40 transmitted via the inner cores 24, 34 are thereby amplified, the amplifier inner core serving as an "in-line" fiber laser. Suitable multiple core optical fiber amplifiers are commercially available, and are known to those skilled in the art, and so will not be described further herein.

Note that optical signals 40 in the inner cores 24, 34 can be transmitted and amplified in any direction. The amplified signals 40 desirably will have a same wavelength and phase as the pre-amplified signals. The wavelength(s) chosen for the optical signals 40 and optical pump should be appropriate for desired excitation of the rare earth ions 26.

Figure 3:
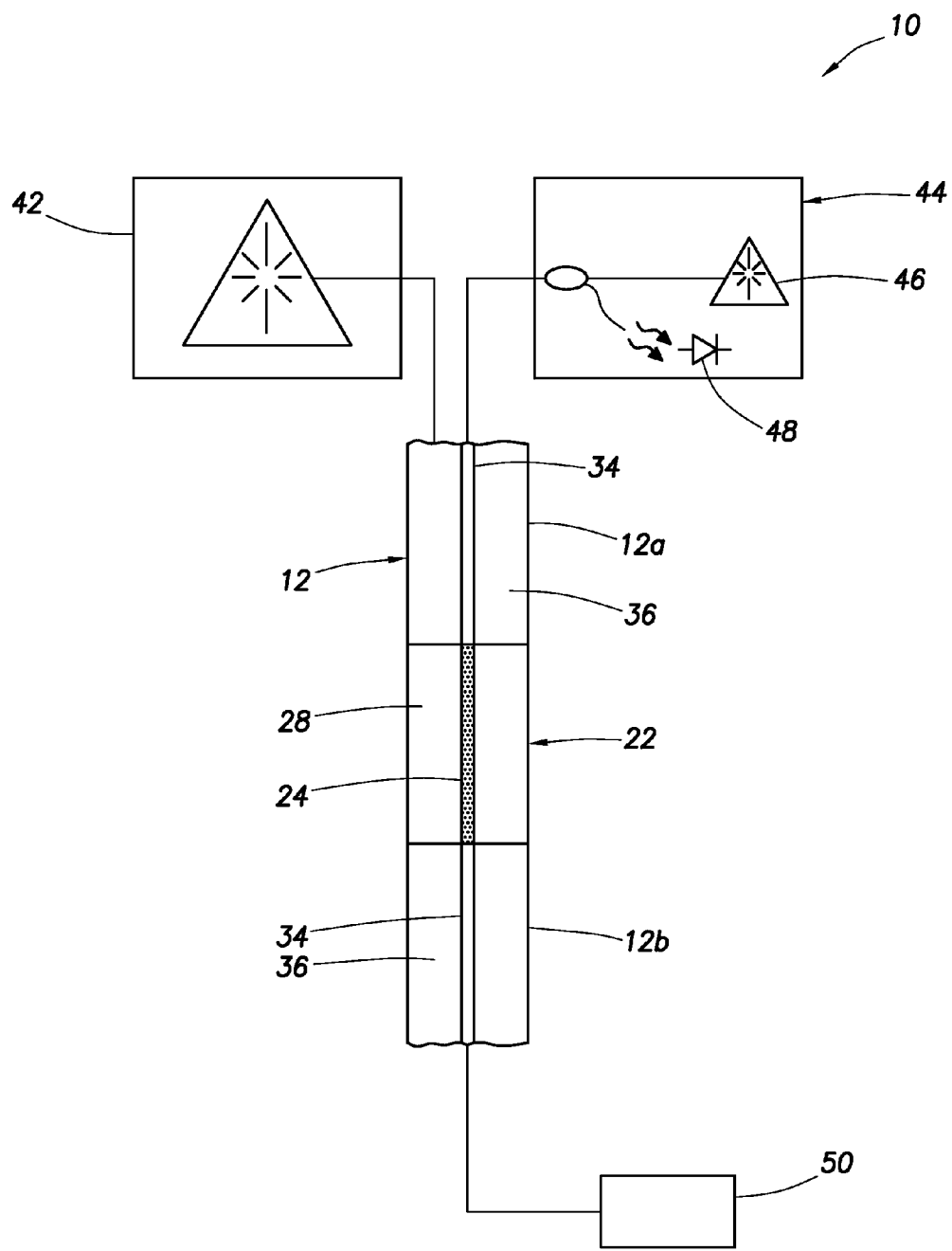
FIG. 3 is a representative schematic view of one example of the system and method.

Referring additionally now to FIG. 3, a schematic view of the system 10 is representatively illustrated, with the optical fiber 12 and amplifier 22 shown in cross-section. A remotely positioned (e.g., at the earth's surface, a subsea facility, etc.) pump laser 42 is used to transmit the optical power 38 through the outer cores 28, 36 of the optical fiber 12 and amplifier 22. An interrogator 44 (comprising, for example, an optical source 46, such as a laser, and a photo-detector 48) is used to transmit and detect the optical signals 40 in the inner cores 24, 34.

Because the signal transmission and amplification functions can be accomplished using the single optical fiber 12, fewer penetrations are needed in wellheads, packers, etc., of the well, and existing penetrations can be more effectively utilized. The use of fewer optical fibers also reduces the risk that an optical fiber will become damaged during rig-up, installation, long term use, etc.

For effective transmission of the optical signals 40, the inner cores 24, 34 can be single mode cores. For effective transmission of optical power 38, the outer cores 28, 36 can be multi-mode cores. However, the scope of this disclosure is not limited to use of any particular core for any particular purpose, or to use of a single or multiple mode core to effectively accomplish that purpose.

In the FIG. 3 example, a downhole sensor 50 is optically connected to the inner core 34. The sensor 50 may be any type of sensor used to measure any well parameter (e.g., pressure, temperature, resistivity, pH, electromagnetic radiation, fluid type, conductivity, acoustic energy, etc.). The optical signals 40 transmitted via the inner cores 24, 34 will preferably include data indicative of the parameter measurements and/or will provide optical power for operation of the sensor 50.

The sensor 50 may be intrinsic or extrinsic relative to the optical fiber 12. An extrinsic sensor 50, such as a pressure sensor, could be optically coupled to the optical fiber 12. An intrinsic sensor 50, such as a fiber Bragg grating used to detect strain, could be part of the optical fiber 12 itself.

Various types of interferometric sensors may be used for the sensor 50. However, it is not necessary in keeping with the scope of this disclosure for the sensor 50 to comprise an interferometric or other type of "optical" sensor.

In some examples, the optical fiber 12 can comprise the sensor 50. For example, distributed temperature, strain, pressure and acoustic energy measurements may be obtained by detecting Raman, coherent Rayleigh, stimulated Brillouin and/or other types of optical back scatter in the inner core 34. Such distributed measurements via detection of optical back scatter are well known to those skilled in the art, and so will not be described further herein.

Figure 4:
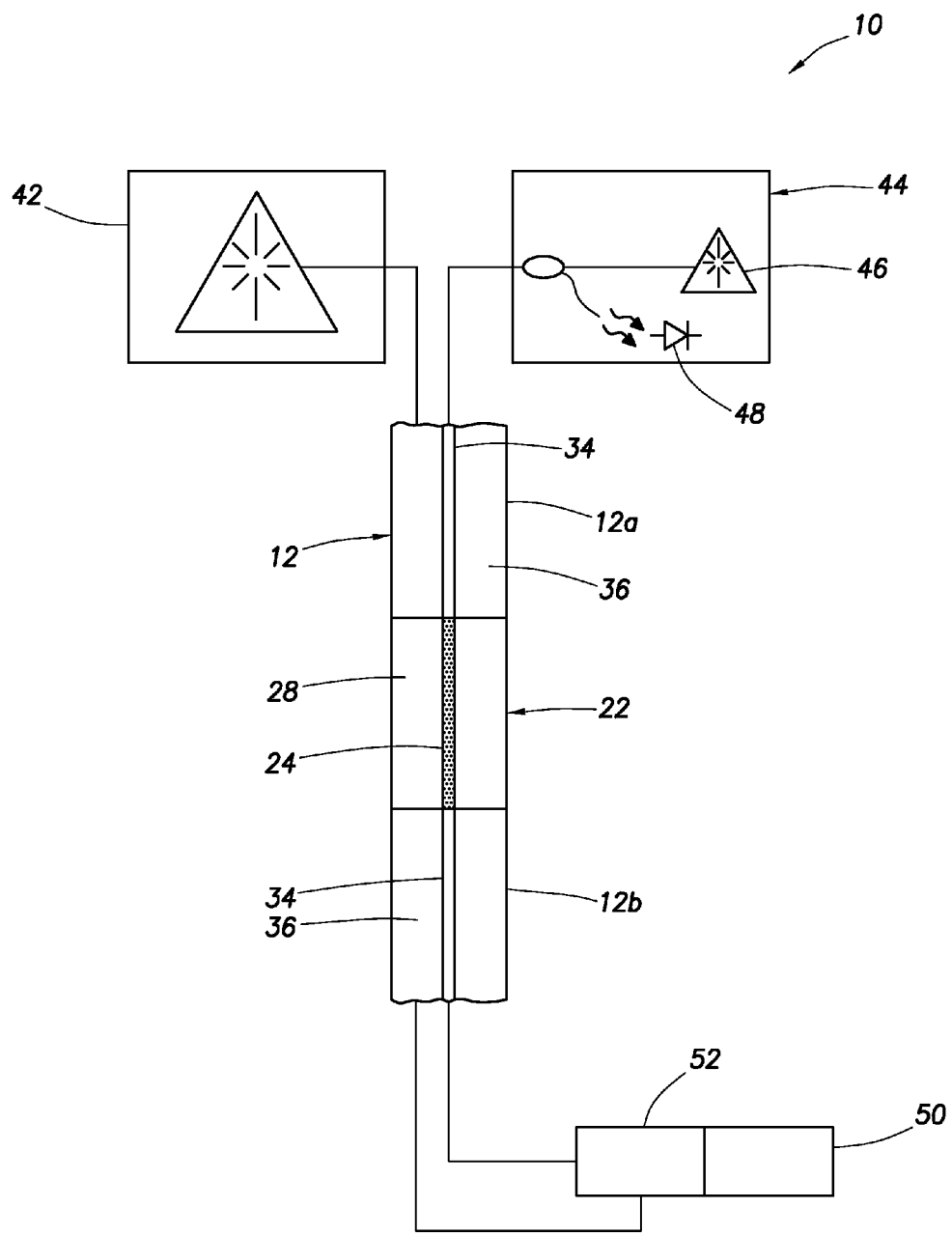
FIG. 4 is a representative schematic view of another example of the system and method.

Referring additionally now to FIG. 4, another example of the system 10 and method is representatively illustrated. In this example, the measurements made by the sensor 50 are modulated onto the inner core 34 using an optical modulator 52.

The modulator 52 is supplied with optical power 38 via the outer core 36. The modulator 52 could include, for example, an optical to electrical converter (such as a photodiode, etc.) which converts the optical power 38 to electrical power, the electrical power may be used to condition and/or amplify electrical or other signals from the sensor 50, and an electrical to optical converter (such as a light emitting diode, etc.) may be used to modulate and transmit the resulting optical signals 40 via the inner cores 24, 34. Of course, the optical power 38 transmitted via the outer core 36 may be used for other purposes downhole (for example, to provide power to other well tools), in keeping with the scope of this disclosure.

Figure 5:
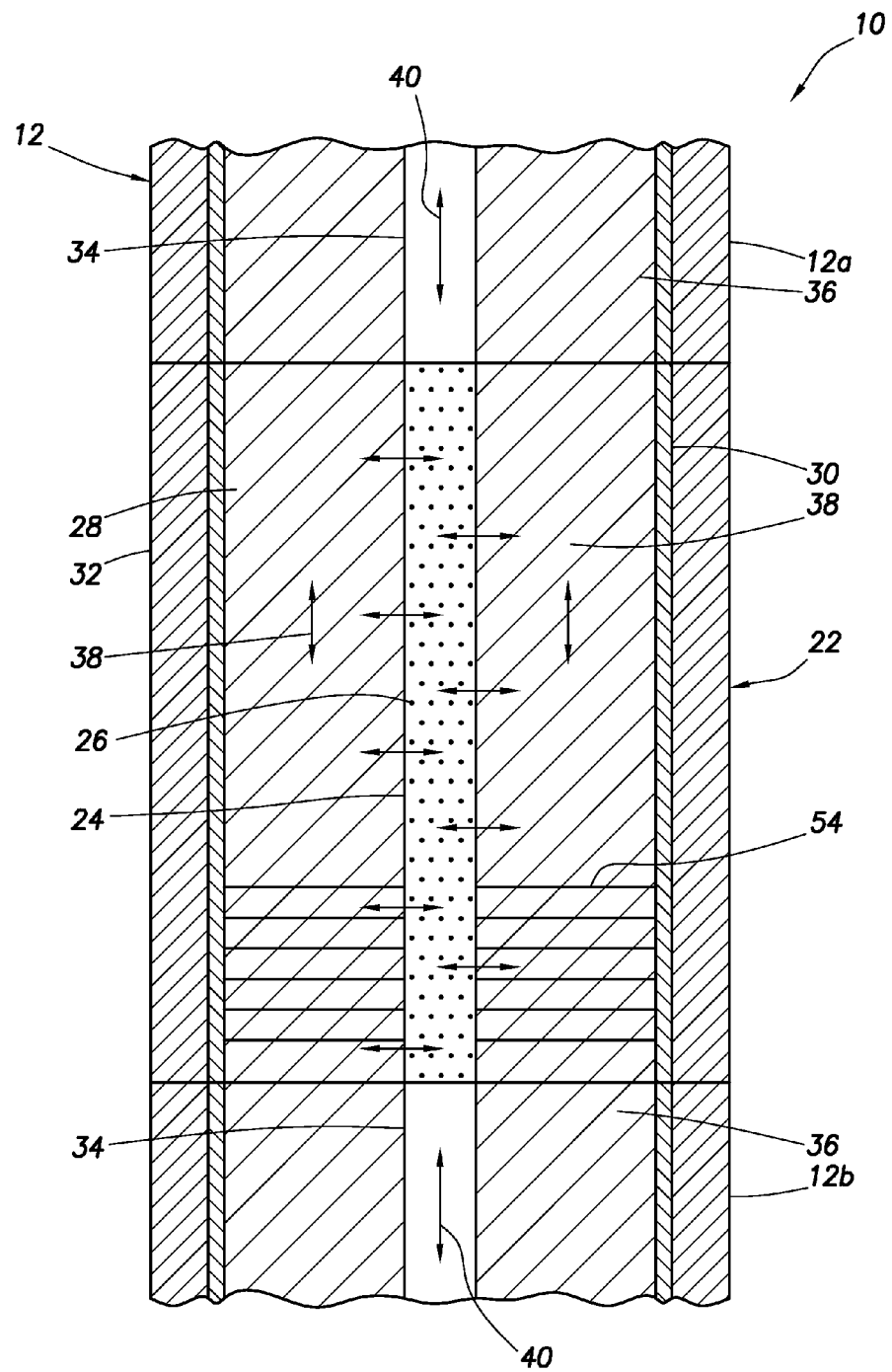
FIG. 5 is an enlarged scale representative cross-sectional view of another fiber amplifier which may be used in the system and method of FIG. 1.

Referring additionally now to FIG. 5, another example of the optical fiber amplifier 22 is representatively illustrated in an enlarged scale cross-sectional view. This example is similar to that depicted in FIG. 3, except that the FIG. 5 example includes a reflector 54 that reflects the optical power 38 in the outer core 28 of the amplifier 22, so that enhanced excitation of the rare earth ions 26 is obtained.

As depicted in FIG. 5, the reflector 54 is in the form of a fiber Bragg grating in the outer core 28. The fiber Bragg grating could, for example, be selected so that it reflects an appropriate wavelength for excitation of the rare earth ions 26.

It may now be fully appreciated that the above disclosure provides significant advancements to the art of constructing and utilizing optical systems in wells. By use of the multiple core 34, 36 optical fiber 12, fewer penetrations and optical fibers may be used. Fewer optical fibers used can result in cost and time savings in installation and maintenance for well optical systems. The multiple core optical fiber amplifier 22 examples described above are especially well suited for use with the multiple core optical fiber 12.

A downhole optical system 10 is provided to the art by the above disclosure. In one example, the system 10 can include an optical fiber 12 disposed in a subterranean well, and an optical fiber amplifier 22 which amplifies optical power in a first core 34 of the optical fiber 12 in the well, the amplifier 22 being optically pumped with optical power 38 in a second core 36 of the optical fiber 12 in the well.

The fiber amplifier 22 may comprise a rare earth doped core 24. Other types of optical amplifiers may be used, if desired.

The optical fiber first core 34 can comprise a single mode core. The optical fiber second core 36 can comprise a multiple mode (multi-mode) core.

The fiber amplifier 22 may be optically connected between sections 12a,b of the optical fiber 12. The fiber amplifier 22 may comprise first and second cores 24, 28 optically connected respectively to the optical fiber first and second cores 34, 36.

The optical fiber first core 34 may be optically connected to at least one sensor 50 in the well. The optical fiber first core 34 may comprise a sensor in the well.

The optical power 38 in the optical fiber second core 36 can be used to modulate a sensor 50 indication transmitted optically via the optical fiber first core 34.

The fiber amplifier 22 can comprise a reflector 54 which reflects the optical power 38 in the optical fiber second core 36 through the fiber amplifier 22.

Another downhole optical system 10 described above can include an optical fiber 12 disposed in a subterranean well, the optical fiber 12 comprising first and second cores 34, 36, and an optical fiber amplifier 22 comprising first and second cores 24, 28 optically coupled respectively to the optical fiber first and second cores 34, 36 in the well. The fiber amplifier 22 may amplify optical power in the optical fiber first core 34, the amplifier 22 being optically pumped with optical power 38 in the optical fiber second core 36.

A downhole optical system 10 described above can comprise, an optical fiber 12 disposed in a subterranean well, and an optical fiber amplifier 22 which amplifies optical power in a single mode core 34 of the optical fiber 12 in the well, the amplifier 22 being optically pumped with optical power in a multiple mode core 36 of the optical fiber 12 in the well. The single mode core 34 may be surrounded by the multiple mode core 36.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used.

Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A downhole optical system, comprising:
    an optical fiber disposed in a subterranean well, the optical fiber comprising first and second cores; and
    an optical fiber amplifier disposed in the well and connected to the optical fiber, wherein the optical fiber amplifier amplifies optical power in the first core of the optical fiber, wherein the optical fiber amplifier is optically pumped with optical power transmitted into the well via the second core of the optical fiber, and wherein the optical power in the second core is provided to an optical modulator that modulates a signal from a sensor and optically transmits the modulated signal via the first core.

2. The downhole optical system of claim 1, wherein the optical fiber amplifier comprises a rare earth doped core.

3. The downhole optical system of claim 1, wherein the first core comprises a single mode core.

4. The downhole optical system of claim 1, wherein the second core comprises a multiple mode core.

5. The downhole optical system of claim 1, wherein the optical fiber amplifier is optically connected between sections of the optical fiber.

6. The downhole optical system of claim 1, wherein the optical fiber amplifier comprises first and second cores optically connected respectively to the optical fiber first and second cores.

7. The downhole optical system of claim 1, wherein the first core is optically connected to at least one sensor in the well.

8. The downhole optical system of claim 1, wherein the first core comprises a sensor in the well.

9. The downhole optical system of claim 1, wherein the optical fiber amplifier comprises a reflector which reflects the optical power in the second core through the optical fiber amplifier.

10. The downhole optical system of claim 1, wherein the first core comprises a single mode core, the second core comprises a multiple mode core, and wherein the first core is surrounded by the second core.

11. A downhole optical system, comprising:
    an optical fiber disposed in a subterranean well, the optical fiber comprising first and second cores; and
    an optical fiber amplifier disposed in the well and connected to the optical fiber, the optical fiber amplifier comprising first and second cores optically coupled respectively to the optical fiber first and second cores, wherein optical power is transmitted into the well via the optical fiber second core to the second core of the optical fiber amplifier, and wherein the optical power in the optical fiber second core is provided to an optical modulator that modulates a signal from a sensor and optically transmits the modulated signal via the optical fiber first core.

12. The downhole optical system of claim 11, wherein the optical fiber amplifier first core is rare earth doped.

13. The downhole optical system of claim 11, wherein the optical fiber first core comprises a single mode core.

14. The downhole optical system of claim 11, wherein the optical fiber second core comprises a multiple mode core.

15. The downhole optical system of claim 11, wherein the optical fiber amplifier is optically connected between sections of the optical fiber.

16. The downhole optical system of claim 11, wherein the optical fiber first core is optically connected to at least one sensor in the well.

17. The downhole optical system of claim 11, wherein the optical fiber first core comprises a sensor in the well.

18. The downhole optical system of claim 11, wherein the optical fiber amplifier comprises a reflector which reflects optical power through the optical fiber amplifier second core.

19. The downhole optical system of claim 11, wherein the optical fiber amplifier amplifies optical power in the optical fiber first core, the optical fiber amplifier being optically pumped with the optical power transmitted via the optical fiber second core.

20. The downhole optical system of claim 11, wherein the optical fiber first core comprises a single mode core, the optical fiber second core comprises a multiple mode core, and wherein the single mode core is surrounded by the multiple mode core.

21. A downhole optical system, comprising:
    an optical fiber disposed in a subterranean well; and
    an optical fiber amplifier disposed in the well and connected to the optical fiber, wherein the optical fiber amplifier amplifies optical power in a single mode core of the optical fiber, wherein the optical fiber amplifier is optically pumped with optical power transmitted into the well via a multiple mode core of the optical fiber, wherein the single mode core is surrounded by the multiple mode core, and wherein the optical power in the multiple mode core is provided to an optical modulator that modulates a signal from a sensor and optically transmits the modulated signal via the single mode core.

22. The downhole optical system of claim 21, wherein the optical fiber amplifier comprises a rare earth doped core.

23. The downhole optical system of claim 21, wherein the optical fiber amplifier is optically connected between sections of the optical fiber.

24. The downhole optical system of claim 21, wherein the optical fiber amplifier comprises first and second cores optically connected respectively to the optical fiber single mode and multiple mode cores.

25. The downhole optical system of claim 21, wherein the single mode core is optically connected to at least one sensor in the well.

26. The downhole optical system of claim 21, wherein the single mode core comprises a sensor in the well.

27. The downhole optical system of claim 21, wherein the optical fiber amplifier comprises a reflector which reflects the optical power in the multiple mode core through the optical fiber amplifier.

* * * * *